Jan. 14, 1964     C. C. PARTON ETAL     3,117,649
SINGLE HANDED TRIPLE CONTROL FOR AUTOMOTIVE VEHICLES
Filed Nov. 19, 1962     2 Sheets-Sheet 2
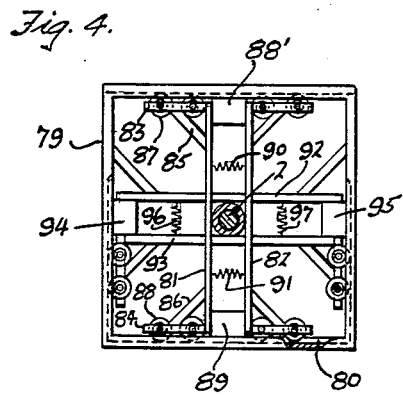
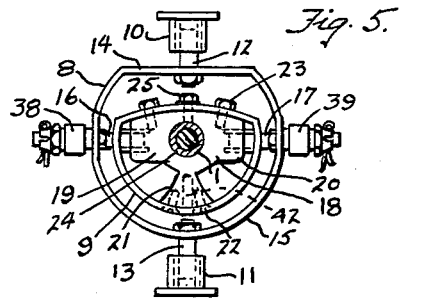
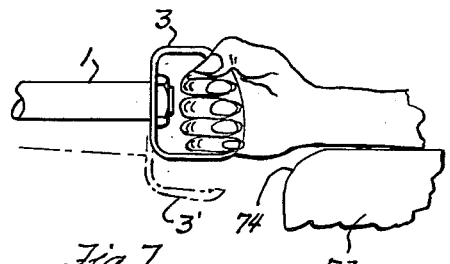
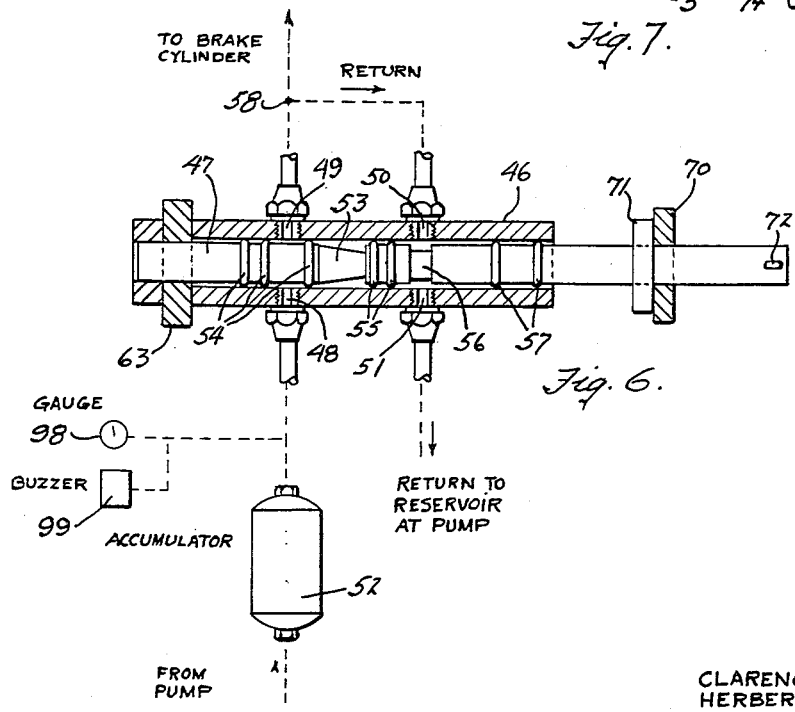
INVENTORS.
CLARENCE C. PARTON
HERBERT D. KINARD
BY
Robert Harding Jr.
ATTORNEY United States Patent Office 3,117,649
Patented Jan. 14, 1964

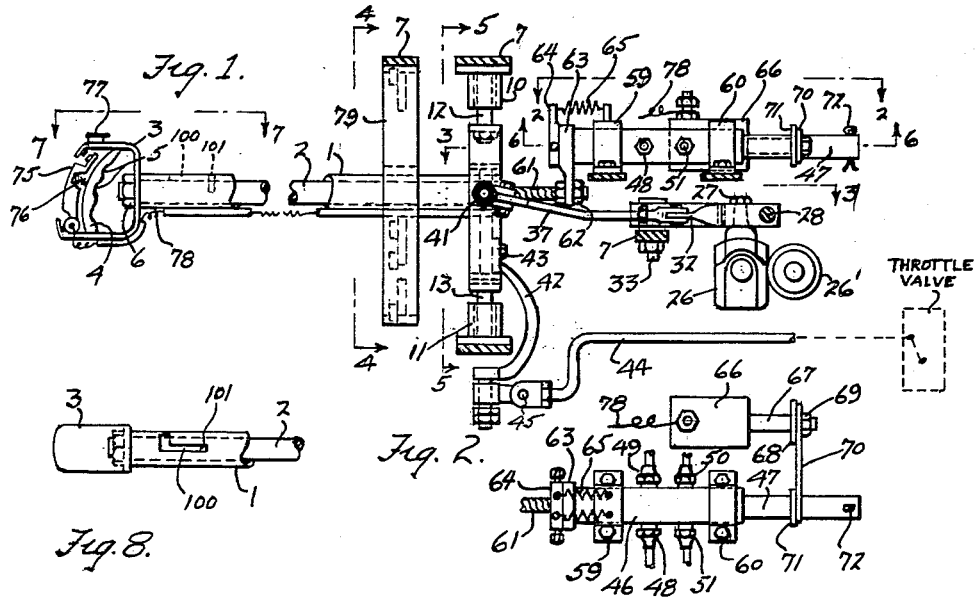

3,117,649
SINGLE HANDED TRIPLE CONTROL FOR
AUTOMOTIVE VEHICLES
Clarence C. Parton, P.O. Box 142, Dallas, N.C., and
Herbert D. Kinard, P.O. Box 2503, Asheville, N.C.
Filed Nov. 19, 1962, Ser. No. 238,649
9 Claims. (Cl. 180—77)

This invention relates to apparatus for controlling the operation of an automobile vehicle.

One of the objects of the invention is to provide a unitary controlling device for controlling the three principal operations of an automobile: steering, acceleration and braking.

Another object of the invention is to provide such a unitary controlling device which may be contained in a compast structure which may be applied to any automobile of the push-button type.

Still another object of the invention is to provide a controlling device for an automobile in which the reaction time for performing any of the necessary functions is much less than in conventional controlling devices.

Another object of the invention is to provide a controlling device for an automobile which will permit much safer operation of the vehicle than conventional controlling apparatuses.

Still another object of the invention is to provide a unitary control device for an automobile which is less expensive to install, takes up less space, and permits easier, more pleasurable, and safer driving than conventional control apparatuses.

Still another object of the invention is to provide a control device for an automotive vehicle in which the steering, accelerating, and braking are controlled by one hand of the operator.

Another object of the invention is to provide a one-hand control for steering, accelerating, and braking the vehicle which may be set so that release of the control handle will cause the gas to be shut off, the brakes to be applied, and the front wheels of the vehicle to be set in their straight-ahead position.

Other objects and objects relating to the construction and assembly of the various parts will become apparent as the description proceeds.

The invention is illustrated in the accompanying drawings, in which:

FIGURE 1 is a side view of the device of the invention showing the handle and the three controls operated thereby;

FIGURE 2 is a plan view of the brake control;

FIGURE 3 is a plan view of the steering control;

FIGURE 4 is a front view of that part of the device which urges the control handle towards a central position;

FIGURE 5 is a front view of the mounting means for the control arm which permits universal movement of the arm about one end;

FIGURE 6 is a sectional plan view of the control valve for the hydraulically operated brakes;

FIGURE 7 is a side view of the handle and the support for the operator's arm in driving position, illustrating the manner of automatically shutting off the gas when the brakes are applied; and FIGURE 8 is a fragmentary plan view of the handle showing the manner of locking the brakes in operated condition.

As is well known, in the conventional push-button type of automotive vehicle, a steering wheel is mounted on a steering post which is supported under the instrument panel, the throttle or accelerator is controlled by a foot pedal in front of the right foot of the operator and the brakes are applied by means of another foot pedal just to the left of the accelerator pedal. The operator must use at least one hand and one foot.

In making a stop, the operator must remove his foot from the accelerator pedal and shift it to the brake pedal and depress the latter. Although the reflex time required to shift the foot for this operation is small, it nevertheless may be sufficient, in an emergency, when a very quick stop is imperative, to cause a delay which may result in an accident. In addition there is always the very real danger of the driver pushing his foot on the accelerator pedal instead of the brake pedal.

By means of our invention, the brakes are applied and the gas is shut off simultaneously, and we can thus shorten the time required for this function by some fifty percent. This is accomplished by providing a single control arm extending from under the instrument panel and equipped with a handle at the end which is adapted to be grasped by one hand. By a slight motion of the wrist, movement of the handle from side to side steers the vehicle; movement of the handle downwards opens the throttle, or, in other words, operates the accelerator to give the engine more gas; while pulling on the handle applies the brakes and shuts off the gas. A conventional hydraulic system is provided for full power steering and power brakes.

The invention eliminates all foot pedals, except the headlight dimmer switch, which could be moved to the instrument panel if desired. It also eliminates the steering wheel and column and therefore provides much more room in the front seat.

The handle provides fingertip control, and because the steering and brakes are operated hydraulically, the handle need not be moved more than two or three inches, either from said to side, up or down, or towards the operator to obtain the required operations.

Referring now to FIGURE 1 of the drawings, the unitary control comprises a sleeve 1 mounted under the instrument panel (not shown) of an automobile and extending towards the driver. A rod 2 is positioned within the sleeve so that it may have longitudinal movement therein. A D-shaped handle 3 is attached to the outer end of the rod 2. The curved part of the handle is enlarged to form a gripping member 4 with curved grooves 5 shaped to fit the fingers when the fingers are closed around the gripping member. The flat part of the handle may be attached to the rod in any desired manner, as by the nut 6 which is threaded onto the end of the rod.

The other end of the sleeve is mounted on a frame 7 of the control unit which may be attached to the frame of automobile to provide universal movement about the end of the sleeve. FIGURE 5 is a front view of an arrangement for providing this universal movement. It comprises two ring-shaped members 8 and 9, the latter mounted within the former. These members are flattened at the top in order to cut down on space. The member 8 is mounted on the frame 7 for rotation about an axis which is substantially vertical by means of aligned bearings members 10 and 11 in which are inserted stud shafts 12 and 13, respectively, which are respectively secured to the upper flattened portion 14 and the lower curved portion 15 of the member 8. The bearings are secured to the frame 7.

The smaller ring-shaped member 9 is mounted within the member 8 for rotation about a substantially horizontal axis by means of aligned shafts 16 and 17 which are anchored in the member 9 and pass through opposite sides of the member 8. To this end a central casting 18 is provided having a thickened T shape with arms 19 and 20 and a base portion 21. The height of the T-shaped member 18 is such, and the shape of its top and bottom edges are such as just to fit within the member 9 between the top and bottom thereof, and it is secured in position by screws 22 at the bottom and screws 23 at the top. The shafts 16 and 17 are rigidly attached to the sides 19 and 20 of the member 18 and extend through the sides of both the members 9 and 8.

Where the horizontal and vertical axes cross, a hole 24 is provided to receive the end of the sleeve 1 which is securely held therein by means of the set screw 25.

It will be apparent with this construction that the sleeve 1 may be swung through an arc from side to side about the vertical axis determined by bearings 10 and 11, while at the same time it may be swung through an arc about the horizontal axis as determined by the shafts 16 and 17 passing through the sides of the member 9. Thus the sleeve 1 can be universally moved about the end which is attached to the mounting means 8—9 of FIGURE 5.

The manner of effecting steering of the vehicle will first be described and will be better understood by reference to FIGURE 3. Full power steering is utilized with the invention and forms no part of the invention except as the steering control is connected to the hydraulic system.

In FIGURES 1 and 3 the servo-valve 26 for the steering system is shown. This is mounted on the carrying cylinder 26' forwardly of the mounting means 8 and 9 and in any desired manner, not shown, so that the control ball stud 27 may be moved horizontally to effect steering and is preferably in a vertical position. A linkage arrangement is provided for moving the stud 27 from side to side as the sleeve 1 is moved from side to side. To this end a guide rod 28 is mounted to extend horizontally just forward to the stud 27. A flat member 29 is slidably mounted on the rod 28 by means of a hole passing longitudinally through the member. The rear edge of the member 29 is provided with a rack 30 which is arranged to mesh with the teeth 31 on a gear segment 32 which is rotatably mounted on a portion of the frame 7 by means of the stud shaft 33. The stud 27 is attached to this member 29 and therefore moves with it.

The left and right sides of the gear member 32 are provided with pivots 34 and 35 which are connected respectively by links 36 and 37 to collars 38 and 39 which are in turn rotatably mounted respectively on shafts 16 and 17 where they protrude through mounting member 8. The shafts are provided with nuts 40 and 41 which are threaded on the ends thereof and locked by cotter pins to hold the collars 38 and 39 in place and permit rotation thereof with respect to the shafts.

The link members 36 and 37 are shown slightly curved in order to give the steering mechanism room below the brake control valve, but it will be understood that any type of linkage may be used as long as the proper motion is transmitted from the sidewise motion of the sleeve 1 to stud 27 of the steering servo-valve 26.

It will be seen that the horizontal component of any motion of the handle 3 will cause the member 8 to pivot about its vertical axis and cause rotation of the gear member 32, which, in turn, will produce sidewise motion of the member 29 along the rod 28, thereby operating the servo-valve of the steering mechanism to steer the vehicle in a well known manner.

The carrying cylinder 26' is indicated just forward of the servo-valve 26, and operation of the servo-valve will admit fluid under pressure to one end or the other of both the steering cylinder and carrying cylinder, only in different volumes, as the carrying cylinder only travels one quarter of the distance travelled by the steering cylinder. This is accomplished by using dual outlet fittings in the servo-valve and using the regular size outlet and line to the steering cylinder and a properly calibrated outlet to the carrying cylinder to limit its travel to one quarter the travel of the steering cylinder to effect steering in a well known manner.

The feeding of gas to the engine by the manipulation of the accelerator or throttle valve will now be described. The lower portion 21 of the member 18 which is secured inside the mounting member 9 is provided with a bracket 42 which extends downwardly therefrom, curving around the lower portions of the members 8 and 9, and may be secured to the portion 21 by means of a screw 43. A link 44 is connected to the end of the bracket by means of the pivot 45 and leads to the throttle valve at the carbureter, similar to the conventional link operated by the accelerator foot pedal.

It will be evident that by tilting the handle downwardly, the mounting member 9 will rotate on its horizontal axis to push the link 44 forward and thus operate the accelerator to feed gasoline to the engine. Raising the handle to its normal position will retract the link 44 and shut off the gas supply.

The hydraulic system for the power brakes may be separate from the steering system or both may be operated from the same pump and accumulator. In FIGURE 6 the hydraulic system for the brakes is illustrated and the brake valve is also shown in FIGURES 1 and 2. The brake valve is a conventional valve comprising a cylinder 46 in which a spool 47 is adapted to have limited longitudinal movement. The cylinder is provided with four ports, 48, 59, 50, and 51, the first two being in alignment and spaced from the last two which are also in alignment. Port 48 is connected to an accumulator 52 which is adapted to hold a supply of fluid under pressure as received directly from a suitable pump, not shown. Port 49 leads to the brake applicator cylinder, also not shown. The spool 47 is provided with a tapered portion 53 with a space around it sealed by spaced piston rings 54 at one end and piston rings 55 at the other. Another portion 56 is of a reduced diameter and the space around it is sealed off by means of the piston rings 55 and spaced piston rings 57, spaced from the other end of the portion 56. The ports 50 and 51 are spaced from the ports 48 and 49, so that when the reduced portion 56 of the spool is aligned with the former ports, the tapered portion 53 is between the two sets of ports, and when the tapered portion 53 is aligned with the ports 48 and 49, the portion 56 is between the two sets of ports.

The port 50 is connected to the pipe leading to the brake cylinder, as at the point indicated at 58, while the port 51 is connected to the reservoir at the pump (not shown).

With the spool 47 in the position shown, fluid is free to pass out of the brake cylinder, through the port 50, around the portion 56 of the spool, through the port 51, back to the reservoir at the pump. Thus the brakes are released. No fluid can pass between the ports 48 and 49.

If the spool is now moved towards the left, as viewed in FIGURE 6, and the portion 53 is brought into alignment with the ports 48 and 49, fluid under pressure passes from the accumulator 52, through the port 48, around the tapered portion 53 of the spool, through the port 49, to the brake cylinder to apply the brakes. Since the portion 53 is tapered, the farther the spool is moved towards the left, the greater the amount of fluid that can pass to the brake cylinder and therefore the harder the brakes will be applied.

Two alternate means are provided to move the spool 47 to the left to apply the brakes. One is controlled by the handle 3 and the other by an automatic arrangement to be later described.

The arrangement controlled by the handle will now be described. The brake valve cylinder 46 is mounted on the frame 7 by brackets 59 and 60, as shown in FIGURES 1 and 2, forward of the mounting means 8—9. The rod 2 which is slidable within the sleeve 1 has a flexible cable 61 attached to the forward end thereof, and this cable is attached by any suitable means, as by the nuts 62, to a member 63 which is slidable on the end of the spool 47 of the brake valve. A collar 64 is attached to that end of the spool 47 and prevents the member 63 from being slipped off the end of the spool. The arrangement is such that when the handle and rod are pulled towards the driver, the cable 61 pulls the member 62 and causes the spool 47 of the valve to be pulled towards the driver against the tension of two springs 65 which extend between suitable lugs on the bracket 59 and similar lugs on the collar 64. Thus the brakes are applied by simply pulling the handle 3, and upon moving the handle forward again, the springs 65 return the spool 47 of the brake valve to release position, as shown in FIGURE 6. The end of the sleeve 1 at the mounting means 8—9 has its opening rounded to permit the cable to move freely in and out regardless of the position of the sleeve.

The alternate arrangement for operating the brake valve 46 provides one of the safety features of the invention. It comprises a solenoid 66, best shown in FIGURE 2, which is attached to the frame 7 adjacent and parallel to the brake valve 46. The solenoid is provided with an armature 67 at the end of which is attached, by means of a collar 68 and nut 69, an arm 70 which has a hole in it through which the end of the spool 47 of the brake valve has a sliding fit. A collar 71 is fixed on the spool 47 adjacent the normal position of the arm 70. The arrangement is such that when the solenoid is energized, the arm 70 will push against the collar 71 and thus push the spool 47 in the direction to apply the brakes. Since the member 63, connected to the cable 61, is free to slide on the end of the spool, the spool may thus be moved without moving the member 63. In other words, the action of the solenoid is entirely independent of the action of the handle, rod, and cable. In like manner, the arm 70 from the armature 67 of the solenoid 66, which is slidable on the end of the spood 47, can remain stationary when the spool is moved towards the driver by pulling the handle, the end of the spool being long enough to permit the desired movement of the spool before the cotterpin 72 at the end of the spool strikes the arm 70.

When the brakes are applied, it is evident that the gas should be shut off, and the manner of accomplishing this automatically will now be described. The single control handle 3 is arranged so that the steering is accomplished by a very small movement to either side which is not more than two and one half inches. Similarly the gas is applied with a corresponding downward movement. These controls can thus be effected by a mere motion of the wrist, keeping the arm steady.

In order to permit comfortable driving, we provide an arm rest 73, shown in FIGURE 7. This arm rest may be of any suitable construction and fits on the front seat at the right side of the driver. It is preferably upholstered and adjustable in height so that it may be positioned to give the most comfortable arm rest for any driver. The forward end 74, however, is curved, as shown, and is spaced far enough from the handle so that the driver's hand may freely move at the wrist.

As shown in solid lines in FIGURE 7, the throttle is at the idling position. When the throttle is opened to give the engine more gas for acceleration, the handle will assume the position shown in the dot-and-dash lines 3'. Now if the driven desires to apply the brakes, he pulls the handle towards him. This will cause his hand to ride up over the curved end 74 of the arm rest 73, with the result that the handle is automatically raised, and raising the handle shuts off the supply of gas, as has already been explained. Thus the application of the brakes will automatically shut off the gas, these two functions being accomplished by the rearward movement of the hand. Pulling on the handle to apply the brakes is an instinctive action which requires little or no practice.

The alternate arrangement for applying the brakes by means of the solenoid 66 is an automatic safety measure which can be used or not as the driver desires. The handle 3 is provided with a micro-switch 75 which is normally closed under the influence of a spring 76. The effect of the fingers as they grasp the handle will be to open the switch. A spring washer detent switch, also on the handle, indicated at 77, is used to close or open the circuit through the micro-switch, as desired. One contact of the micro-switch is connected to ground on the handle and the other contact is connected by means of the wire 78 to the solenoid, the other end of the solenoid being connected to the battery, as will be understood. If the switch 77 is closed and the handle is released, the switch 75 closes and operates the solenoid to apply the brakes. Thus, the vehicle is stopped if the driver lets go of the handle. The manner in which the gas is also shut off will appear later.

A feature of the invention is an arrangement by means of which the front wheels of the vehicle will tend to assume a straight-ahead position and the gas will be shut off if the handle is released. This is illustrated in FIGURES 1 and 4. It comprises a square frame 79 which is secured to the frame 7 in any desired manner in a position spaced a short distance from the mounting means 8—9 so that the sleeve 1 extends through its center. The members of the frame 79 are of heavy enough material to provide tracks 80 which extend the length of the lower and upper members and part way along the side members for a purpose to be explained. A pair of guide bars 81 and 82 are arranged parallel to each other on the left and right, respectively, of the sleeve 1 and are so mounted in the frame that each one can move towards its nearest side of the frame while maintaining its parallel relation with the other bar. This is accomplished by providing the bar 81 with upper and lower feet 83 and 84, respectively. These feet are securely attached to the bar and held in a rigid position with respect to the bar by means of bracing members 85 and 86, respectively. Each of the feet 83 and 84 are provided with rollers 87 and 88 which are rotatably mounted on the feet 83 and 84 and ride in the tracks 80 in their associated frame members. The bar 82 is provided with similar feet and rollers which ride in the tracks.

At the top of the frame, between the bars 81 and 82, is a block 88' and a similar block 89 is provided at the bottom of the frame. These blocks are attached to the frame and act as stops which prevent the bar 81 from moving any farther to the right and the bar 82 from moving any farther to the left. Springs 90 and 91 connected between the bars urge both bars towards the blocks 88' and 89.

The bars 81 and 82 will thus always urge the sleeve towards its central horizontal position. Two bars 92 and 93 positioned horizontally above and below the sleeve 1 perform the same function in a vertical direction. Since the central position of the sleeve 1 in a vertical direction determines the idling condition of the throttle valve, and downward motion of the sleeve is used to open the throttle, it is not necessary to permit the sleeve to move upwardly beyond the central position shown in FIGURE 4. For this reason the upper bar 92 is rigidly secured to the frame. The lower one 93, however, is provided with the feet and rollers similar to the bars 81 and 82. Blocks 94 and 95, attached to the frame at the left and right sides, respectively, provide stops for the lower bar 93. Of course both bars 92 and 93 can be mode to move if desired.

Springs 96 and 97 are provided between the bars 92 and 93 to urge them towards the central position.

In operating the automobile, if the driver desires not to use the automatic braking facility, he moves the switch 77 to the "off" position and grasps the handle. Then with the conventional automatic shift lever in the drive position, he moves the handle downwardly by a simple bend of the wrist. This will move the sleeve 1 downwardly about the axis defined by the shafts 16 and 17 which moves the bracket 42 and the link 44 forwardly and feeds gas to the engine. Then by moving his hand left and right by a simple bend at the wrist, the sleeve 1 and mounting member 8 will turn about the axis defined by the shafts 12 and 13. This will cause rotation of gear member 32 by means of the links 36 and 37 and corresponding movement of the member 29 to shift the stud 27 of the servo-valve 26 to cause fluid to flow into one end or the other of the carrying cylinder 26′ and into the corresponding end of the steering cylinder, (not shown), to effect steering of the vehicle. As has already been mentioned, the ratio of movement of the various parts may be such that the complete range of movement of the front wheels of the vehicle may be effected by a two and a half inch movement towards one side or the other.

Now if the driver desires to stop the vehicle, he has only to pull back on the handle, whereupon the rod 2 will move rearwardly within the sleeve 1 and the cable 61 will pull the spool 47 of the brake valve 46 to open the passage from the port 48 connected to the accumulator 52 through the valve, around the tapered portion 53 of the spool, and the port 49, to the brake cylinder to apply the brakes. The force required to apply the brakes in this manner is only that necessary to move the spool 47 against the tension of the springs 65, so that very little pull is required to apply the brakes fully.

This control of the vehicle by such a slight movement of the hand greatly aids in the safe and comfortable control of the vehicle. The reaction time required to apply the brakes after seeing a dangerous situation ahead is reduced over the conventional brake pedal and accelerator pedal by some fifty percent. This in itself will undoubtedly prevent many accidents. In addition there is no danger of operating the accelerator instead of the brake in an emergency, as there is with conventional automobile controls. Such an erroneous action results in many accidents.

The fact that driving is so easy with our unitary control eliminates much of the strain accompanying driving in a conventional automobile and will eliminate many accidents now caused by overtired drivers.

The safety feature of the automatic deceleration and braking if the operator releases the handle is particularly applicable to heart patients and diabetics who tend on occasions to lapse suddenly into unconciousness, or those subject to fainting spells, or to a driver who might fall asleep at the controls, or one who was struck by a flying object, such as a bullet or stone, or to a driver whose hand might be momentarily knocked from the control handle because the vehicle strikes a heavy object or was struck by another vehicle. In all of these cases, the automatic braking solenoid would apply the brakes and the centering device 79 would pull the sleeve 1 to its normal central position which would shut off the gas and set the wheels straight ahead.

Our unitary control is also better for use by a paraplegic than controls now in use by such persons because of its ease of operation and the safety features already described.

In a hydraulic system of this nature, the accumulator 52 is sufficient to hold the pressure of the operating fluid for some minutes after some failure of the pump, as by a broken driving belt. We prefer, however, to guard against the failure of the pressure by having a pressure gauge on the instrument panel, as indicated at 98, and also a buzzer 99 which will sound if the pressure falls below a predetermined minimum and direct the driver to inspect the gauge. The pressure will be sufficient in the accumulator to drive the vehicle for several minutes before falling so low that the controls will not operate properly.

The manner of locking the brake in full braking condition when the vehicle is standing is illustrated in FIGURES 1 and 8 and simply comprises a bayonet-slot 100 in the sleeve 1 which may be positioned near the handle, as shown, with the longer portion of the slot extending longitudinally of the sleeve. A pin 101 is mounted on the rod 2 in such a manner that it will ride in the slot when the rod is pulled when applying the brakes. Then by turning the handle through an angle of say 40°, the pin will enter the shorter portion of the slot at right angles to the other portion and the rod will be held in the full-braking position until released by rotating the handle in the other direction.

The invention provides an economical, much more easily operated control for an automotive vehicle and one which has safety features that should reduce the number of accidents and make any driver a better driver. All the various parts of the control may be mounted close together so that they may be contained in a single box which is indicated in FIGURE 3 by the dotted line 102. Therefore it will be seen that the entire system including the steering valve and cylinder and the brake valve and associated solenoid may be attached under the instrument panel making a very economical assembly job.

Various modifications may be made in the arrangement shown and described without departing from the spirit of the invention and we do not desire to limit the invention except by the limitations contained in the appended claims.

What we desire to claim and secure by Letters Patent is:

1. An automobile control comprising a sleeve, means for mounting one end of said sleeve on the frame of the automobile for universal movement of said sleeve about said one end and with the other end extending rearwardly of said automobile, an arcuate gear member, means for mounting said gear member on said frame for rotation about an axis lying in a plane which is substantially vertical and parallel to the direction of movement of said automobile, connecting means between said gear member and said sleeve for translating horizontal components of motion of said sleeve as it is moved about said mounting means into limited rotation of said gear member, hydraulic steering control means for said automobile mounted on said frame, a rack mounted on said frame for longitudinal movement tangentially to and meshing with said gear member and connected to said steering control means for causing longitudinal movement of said rack in either direction to effect steering of said automobile in a corresponding direction, a lever extending outwardly from said one end of said sleeve and lying in a substantially vertical plane which is parallel to the direction of movement of said automobile, a throttle valve mounted on said frame, a link connecting the end of said lever with said throttle valve so as to cause vertical components of movements of said sleeve to cause corresponding adjustments of said throttle valve, a rod slidably mounted within said sleeve and having one end extending out of the rear end of said sleeve, a handle attached to said one end of said rod, a hydraulic brake valve for controlling the brakes of said automobile mounted on said frame adjacent to and forward of said mounting means, and a flexible cable having one end attached to the other end of said rod and the other end extending out and said sleeve and connected to said brake valve, whereby a rearward movement of said rod with respect to said sleeve will operate said brake valve to set the brakes.

2. An automobile control, as defined in claim 1, further comprising resilient means connected between the frame of the automobile and the sleeve at a point spaced from the mounting means for urging said sleeve into a central position with respect to its ranges of movement.

3. An automobile control, as defined in claim 2, in which the means for urging the sleeve into a central position comprises a first pair of guide bars parallel to each other and on opposite sides of the sleeve, a second pair of guide bars parallel to each other and at right angles to said first pair and on opposite sides of said sleeve, means for mounting said guide bars for movement only in directions at right angles to said bars, resilient means for urging the bars of each pair towards each other, and stop means for each bar for preventing motion thereof towards the other side of its central position.

4. An automobile control, as defined in claim 3, in which the means for mounting the guide bars comprises a rectangular frame, tracks on the inner sides of said rectangular frame, said guide bars extending between the opposite sides of said frame, a foot on each end of at least three guide bars extending at right angles thereto, rollers on each foot adapted to roll on the adjacent track, whereby each pair of bars is maintained in parallel relation regardless of their position within said frame, and in which the resilient means for urging the bars of each pair towards each other comprises springs attached between the bars of each pair.

5. An automobile control, as defined in claim 4, further comprising auxiliary brake valve control means mounted on the frame of the automobile, means for connecting said auxiliary control means to the brake valve independently of the rod and handle, a switch on said handle, and means for rendering said auxiliary control means operative or inoperative under control of said switch.

6. An automobile control, as defined in claim 5, in which the switch on the handle is adapted to be maintained in one condition when the hand of an operator is gripping the handle to render the auxiliary control means operative, but to assume another condition when the hand releases its grip on the handle to render the auxiliary control operative to set the brakes.

7. An automobile control, as defined in claim 6, in which the handle is a substantally vertically positioned member with notches to accommodate the fingers on the forward side thereof.

8. An automobile control, as defined in claim 1, in which the sleeve extends rearwardly from the instrument panel of the automobile so that the handle is in a convenient position to be grasped by the hand of the operator.

9. An automobile control, as defined in claim 1, in which the mounting means for the sleeve and the three control means are contained within a box as a single unit which is mounted under the instrument panel of the automobile.

References Cited in the file of this patent

UNITED STATES PATENTS

| | | |
|---|---|---|
| 572,051 | Duryea | Nov. 24, 1896 |
| 652,940 | Whitney | July 3, 1900 |
| 1,347,502 | Frogh | July 27, 1920 |
| 2,176,170 | Flowers | Oct. 17, 1939 |
| 2,847,027 | Kumpman | Aug. 12, 1958 |
| 2,869,664 | Utter | Jan. 20, 1959 |
| 3,022,850 | Bidwell et al. | Feb. 27, 1962 |